Feb. 9, 1937. J. H. COHEN 2,069,942
SUCTION CUP
Filed Aug. 17, 1935
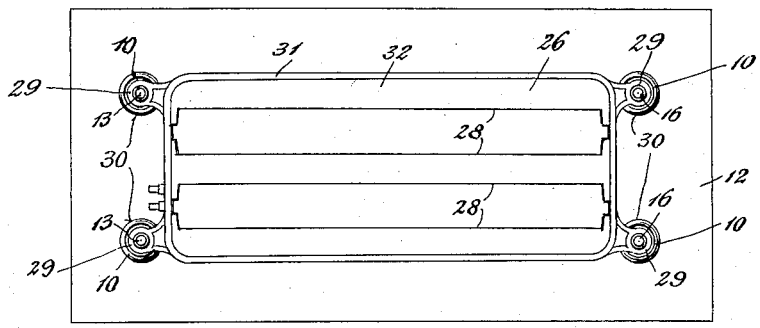
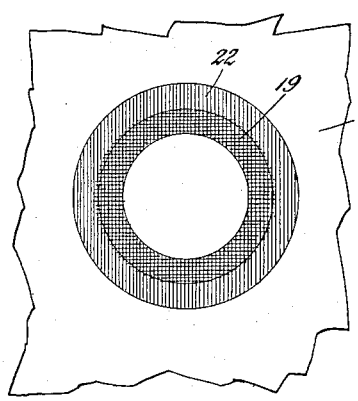
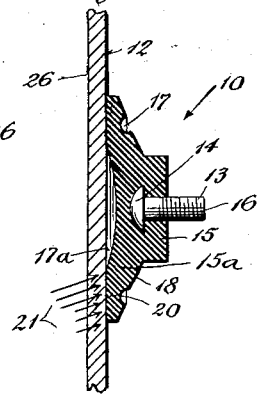
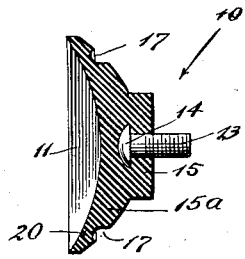
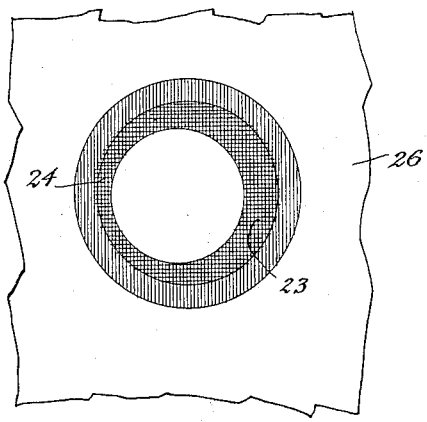
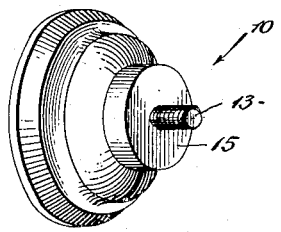
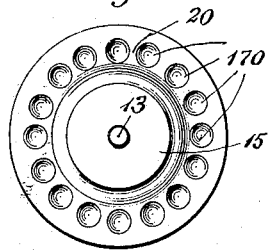
INVENTOR
BY Joseph H. Cohen
ATTORNEY Patented Feb. 9, 1937

2,069,942

UNITED STATES PATENT OFFICE 2,069,942

SUCTION CUP

Joseph H. Cohen, Bridgeport, Conn., assignor to Casco Products Corporation, Bridgeport, Conn., a corporation of Connecticut Application August 17, 1935, Serial No. 36,684

1 Claim. (Cl. 248—206)

This invention relates to suction cups for adhering to various surfaces and supporting objects thereby, and more particularly to suction cups for supporting defrosting heaters on the windshields of automobiles.

A way for overcoming the undesirable and hazardous deposit of ice, snow, and sleet on the windshield of an automobile is the attaching of an electric warmer to the inside of the windshield by means of suction cups. This idea was found to be efficacious as far as cleaning the impaired vision was concerned, but considerable trouble was experienced with the suction cups in supporting the heating member on the windshield, particularly when the more elaborate and heavy glass type heaters were employed. Various means were adopted in an effort to provide a more secure and lasting adherence of the cup to the windshield glass; these including wetting of the cup lips before applying, with water, glycerine or other suitable and viscous preparations, or even cementing of the cups to the glass. However, the difficulty was not overcome, for those means which provided permanence of attachment did not permit of ready removal, and those means which provided ready removal were found lacking in permanence and security under the conditions above referred to.

It was not thought to alter the form and construction of the cup in a way which could provide both security of attachment and ease of removal, until this present invention.

It is proposed by this invention to provide a continuous circular groove in the outer convex surface of a suction cup, said groove being substantially equi-distant at all points from the edge of the lip and adjacent thereto. It has been found that this change renders the cup much more efficient and effective as an adhering and supporting device.

A particular feature of this invention is the provision of a suction cup which resists to a marked degree any pressure in a lateral or sidewise direction.

Another feature of this invention is the provision of a suction cup which adheres firmly and securely to a surface for a long period of time, even though that surface is subject to vibration.

A further feature of this invention is the provision of a suction cup which can be released intentionally and with ease from the surface to which it has been attached.

Other features and advantages will hereinafter appear.

In the drawing—

Figure 1 is a perspective view of the present preferred type of suction cup, made in accordance with the present invention.

Fig. 2 is a sectional view of the cup.

Fig. 3 is a sectional view of the cup adhering to a flat surface.

Fig. 4 is a view of the underside of the cup, seen through a plate of glass to which the cup has been caused to adhere.

Fig. 5 is a view of the underside of the cup adhering to a plate of glass and suffering a substantial lateral or sidewise pressure from left to right.

Fig. 6 is a front view showing a heater attached to a windshield by means of four suction cups of this invention.

Fig. 7 is a face view of a modification of the present suction cup, having shallow pockets disposed in a circle on the convex surface of the cups.

The suction cup 10 of the present invention is made of a flexible and elastic non-porous material and preferably of soft molded rubber. It has a concave face 11 which is applied firmly to the surface 12 to which the cup is to be fastened. A screw 13 has its head 14 embedded in the body 15 of the cup. The threaded shank 16 of the screw protrudes, and with a nut shown in Fig. 6 forms a convenient means of attachment to the cup of anything desired to be supported.

The flexible suction cup, according to the present invention, has formed therein a continuous groove 17 in the outer convex surface 18 for the purpose of weakening and making more flexible an annular portion of the walls of the cup and at the same time retaining a substantial rim structure. The provision of this groove with its accompanying change in the flexure of the cup walls alters the action of the cup in a manner which is easily discernible. Whereas, a cup without the groove has its area of intimate contact substantially and near the rim, the provision of the groove 17 with its attendant weakening of the cup walls extends this area of contact in a direction away from the rim of the cup, and substantially toward the center, as is shown by the shaded portion 19 of Fig. 4.

The action of the cup of the present invention, wherein a groove is provided in the outer convex surface, is definitely different in the following respects from the action of an ordinary cup. Firstly, the incorporating of a suitable groove allows the body 15 and the adjacent wall portions 15a (see Fig. 3) of the cup to act substantially as a rigid member, when under outside pressure, in transmitting pressure to the weakened portion 20 of the cup wall which contacts with the glass plate. There results from this action a pressure whose magnitude at various points is represented by arrows 21, and which graphic representation indicates that there is a clearly defined continuous band of intimate high-pressure contact bounding the region 17a of partial vacuum, and which line of clear demarkation is not obtained in the usual suction cup. Secondly, the incorporating of a suitable groove, which weakens the cup wall, removes largely the prying tendency exerted by the body of the cup at the inner surfaces of contact that directly bound the region of low pressure 17a, and which prying action is to be avoided in maintaining a constant and continual adherence of the cup to the supporting surface. Thirdly, whatever small unavoidable prying action might still exist at the inner surfaces of contact due to the distortion of the material is, because of the unequal and inwardly increasing pressure on the contact surface, directed at the inner well-defined line of intimate high-pressure contact, which region is best able to withstand such prying action without giving way.

Moreover, it has been found by providing for an inner band of highly intimate contact 19, see Fig. 4, and an outer band of less highly intimate contact 22, that when the vacuum cup is applied to a surface in conjunction with any of the common viscous prepartions used for sealing purposes, such as glycerine, the outer band 22 of less intimate contact does not squeeze out said viscous preparation but retains same forming in effect an obturating band which effectively seals the region of partial vacuum 17.

Furthermore, by locating the obturating band 22 so that it is separated from the region of partial vacuum 17 by the band of highly intimate contact 19, the tendency of the sealing preparation in the obturating band 22 to travel to the region of partial vacuum 17 because of the outside atmospheric pressure is strongly resisted by the band of highly intimate contact 19 thereby preserving substantially the initial degree of the partial vacuum 17a. The permitting of the sealing preparation to move from the obturating band 22 to the region of partial vacuum 17 would lessen the degree of vacuum because of the space said preparation would occupy.

In Fig. 5 is shown the under surface of a suction cup of the present invention applied to a plate of glass and resisting pressure in a lateral direction from left to right. The shaded portions 23 and 24 represent respectively the areas of intimate contact opposite from and adjacent to the applied lateral force. The area of contact 23 is much larger than the area of contact 24, and receives a major portion of the pressure applied laterally. By virtue of the increased friction at the enlarged region 23, the lateral pressure applied to the body of the cup is resisted to a marked degree, in the present form of cup, and hence the cup of the present invention may support a weight much greater than a cup heretofore used and of substantially the same size.

Although a groove has been molded in the convex surface of the flexible suction cup of the present invention in its present preferred form for the purpose of making an annular portion of the walls weaker and more flexible, any other equivalent change in wall structure which would serve the same purpose may be employed. Fig. 7 shows one form of modification of the present invention, in which a flexible suction cup has shallow cavities or pockets 170 disposed in a circle on the convex surface of the cup, for the purpose of weakening an annular section of the walls.

Due to the increased security resulting from the action hereinbefore described of the suction cup of the present invention, it is possible to employ this improved cup on slightly undulating or wavy surfaces, such as are met in certain types of translucent glass, or on curvilinear surfaces such as semi-cylindrical corner windows of stores, etc.

From the foregoing, it is seen that the flexible suction cup of the present invention provides a particularly secure and convenient means of attaching heating and defrosting devices to automobile windshields, as shown in Fig. 6, and in fact, all manner of devices of reasonable weight to various surfaces.

In Fig. 6, a glass pane 26 is held in a frame 27, and encloses heating coils 28. The frame has ears 29 which attach to four cups 30 of the present invention. A rubber skirt 31 is provided on the frame, and continually presses against the glass windshield 32 sealing the space enclosing the heating coils, and providing a continual pull on the cups 30; the cups of the present invention, with their improved security and adhering powers can support a weight such as the heater of Fig. 6, with its attendant pressure of the rubber skirt 31 much better than the suction cups heretofore used.

Other modifications and variations may be made within the scope of this invention, and portions of the improvements may be used without others.

Having thus described the invention, what is claimed as new and for which it is desired to obtain Letters-Patent is:—

A soft rubber suction cup having an inner wall substantially smoothly spherically curved all over, such curvature extending to substantially the periphery of the cup, said cup having an outer wall interrupted by an annular groove substantially concentric with the center of the cup and spaced inwardly of the periphery thereof, there being a diminution of thickness of the cup all around the same from a substantially central portion thereof to said groove and a further and a gradually and substantially uniform diminution of thickness of the cup all around the same beyond said groove and substantially to the periphery of the cup, the annular portion of the outer wall of the cup beyond said groove and the inner wall of the cup so approaching each other toward the periphery of the cup that at said periphery the cup has a side wall at least as wide as said groove is deep, thereby so to distribute and relatively affect the flexibility of the various rubber masses of the cup relative to said groove that on compressing the cup against the surface to which it is to be attached by suction the outer marginal portion of the substantially spherically curved inner wall is flattened to a substantially plane disposition all over and to a true plane disposition at an inner annular subdivision of said marginal portion, said inner annular subdivision being wider than said groove and establishing an annular zone of grip for the cup likewise wider than said groove, while at the same time the remainder of said marginal portion is held substantially flat against said support.

JOSEPH H. COHEN.